(12) United States Patent
Mariat et al.

(10) Patent No.: US 10,829,218 B2
(45) Date of Patent: Nov. 10, 2020

(54) AIRCRAFT CABIN HAVING A PARTIALLY REMOVABLE PARTITION WALL BETWEEN PASSENGER SEATS

(71) Applicants: AIRBUS INTERIORS SERVICES (AIS), Toulouse (FR); AIRBUS (SAS), Blagnac (FR)

(72) Inventors: Sylvain Mariat, Leguevin (FR); Béranger Chantal, Bretx (FR); Nicolas Ferrere, Moissac (FR); Nicolas Rios, Bessens (FR)

(73) Assignees: AIRBUS INTERIORS SERVICES (AIS), Toulouse (FR); AIRBUS (S.A.S.), Blagnac (FR)

( * ) Notice: Subject to any disclaimer, the term of this patent is extended or adjusted under 35 U.S.C. 154(b) by 318 days.

(21) Appl. No.: 15/937,466

(22) Filed: Mar. 27, 2018

(65) Prior Publication Data
US 2018/0281961 A1 Oct. 4, 2018

(30) Foreign Application Priority Data
Mar. 31, 2017 (FR) ...................................... 17 52756

(51) Int. Cl.
*B64D 11/00* (2006.01)
*B64D 11/06* (2006.01)

(52) U.S. Cl.
CPC ...... *B64D 11/0023* (2013.01); *B64D 11/0601* (2014.12); *B64D 11/064* (2014.12); *B64D 11/0606* (2014.12); *B64D 11/0638* (2014.12)

(58) Field of Classification Search
CPC ............ B64D 11/0023; B64D 11/0601; B64D 11/0602; B64D 11/0605; B64D 11/0606;
(Continued)

(56) References Cited

U.S. PATENT DOCUMENTS 5,024,398 A 6/1991 Riedinger et al.
7,354,018 B2 * 4/2008 Saint-Jalmes .......... B64D 11/00
105/315
(Continued)

FOREIGN PATENT DOCUMENTS

GB 2 362 095 11/2001
GB 2531167 A * 4/2016 ......... B64D 11/0601

OTHER PUBLICATIONS

FR Search Report for FR1752756 dated Jul. 17, 2017, 2 pages.

*Primary Examiner* — Joseph W Sanderson
(74) *Attorney, Agent, or Firm* — Nixon & Vanderhye P.C.

(57) ABSTRACT

An passenger cabin of an aircraft including a floor (108) on which are mounted a front seat (104a), a rear seat (104b) and a partition wall separating the front and rear seats, wherein the front seat (104a) pivots about an axis perpendicular to the floor (108) through an angle of at least 180 degrees, and the partition wall (106) has a fixed lower portion (106a) and a removable upper portion, and wherein a securing means has a securing position which secures the upper portion to the lower portion (106a), and a release position which allows the upper portion to detach from the lower portion (106a). The pivoting front seat and partition wall with detachable upper portion provide a first configuration seating configures that provides confidentiality between two passengers seated one behind the other, and a second configuration that permits communication between the seated passengers.

14 Claims, 2 Drawing Sheets

(58) Field of Classification Search
CPC ........ B61D 1/04; B61D 17/048; B61D 33/00;
B60N 2/01; B60N 2/91; B62D 47/003
See application file for complete search history.

(56) References Cited

U.S. PATENT DOCUMENTS

| | | | | |
|---|---|---|---|---|
| 7,647,151 | B2* | 1/2010 | Abt | B64D 11/06 |
| | | | | 701/45 |
| 7,712,831 | B2* | 5/2010 | Abt | B64D 11/0643 |
| | | | | 297/257 |
| 9,266,614 | B2* | 2/2016 | Henshaw | B60N 2/01 |
| 10,124,895 | B2* | 11/2018 | Simeon | B64D 11/0601 |
| 10,562,630 | B2* | 2/2020 | Reams | B64D 11/0624 |
| 2005/0001097 | A1* | 1/2005 | Saint-Jalmes | B64D 11/00 |
| | | | | 244/118.6 |
| 2008/0007101 | A1* | 1/2008 | Abt | B64D 11/0643 |
| | | | | 297/240 |
| 2008/0009958 | A1* | 1/2008 | Abt | B64D 11/06 |
| | | | | 700/29 |
| 2014/0361585 | A1* | 12/2014 | Henshaw | B60N 2/01 |
| | | | | 297/174 R |
| 2014/0373759 | A1 | 12/2014 | Rumeau | |
| 2016/0297524 | A1* | 10/2016 | Simeon | B64D 11/0601 |
| 2017/0129608 | A1* | 5/2017 | Reams | B64D 11/0624 |
| 2017/0225787 | A1* | 8/2017 | Schliwa | B64D 11/0606 |
| 2018/0312082 | A1* | 11/2018 | Lalague | B60R 21/026 |
| 2018/0312127 | A1* | 11/2018 | Lalague | B62D 33/042 |
| 2019/0315468 | A1* | 10/2019 | White | B64D 11/0605 |

* cited by examiner

AIRCRAFT CABIN HAVING A PARTIALLY REMOVABLE PARTITION WALL BETWEEN PASSENGER SEATS

RELATED APPLICATION

This application claims priority to French Patent Application 1752756 filed Mar. 31, 2017, the entirety of which is incorporated by reference.

TECHNICAL FIELD

The present invention relates to an aircraft having a particular configuration for passenger seating wherein a pair of seats, one in front of the other, may be arranged in either of two positions, one of which provides confidentiality between the passengers seated in the seats, and the other permitting passengers to talk to each other while facing each other in the seats.

PRIOR ART

In certain aircraft, the internal configuration makes it possible to provide better comfort for passengers by installing individual, high-status seats. These seats provide a certain degree of confidentiality owing to the fact that they have relatively high backs and thus a passenger cannot see what the passenger seated in the seat immediately in front of him is doing. Although such conventional seats are comfortable and well-received, a passenger and the passenger seated in front cannot easily converse with one another. Indeed, conventional seats of this type are not designed to permit such communication.

SUMMARY OF THE INVENTION

An internal configuration for an aircraft has been invented and is disclosed herein that provides, in one configuration, confidentiality between passengers seated in front and back seats and, in another configuration, the option for these two passengers to communicate, e.g., talk, with one another.

In one embodiment, the invention, when installed on the floor of an aircraft cabin, includes a front seat and a rear seat arranged behind the front seat, the front seat being able to pivot about an axis perpendicular to the floor, through an angle of at least 180°, a partition wall arranged between the front seat and the rear seat, perpendicular to the floor and perpendicular to the direction of advance, said partition wall having a fixed lower portion and a removable upper portion, and a securing means able to adopt a securing position in which the upper portion of the partition wall is secured to the lower portion, and a release position in which the upper portion can be detached from the lower portion.

Such an aircraft thus proposes a first configuration that provides confidentiality between two passengers seated one behind the other, and a second configuration that permits communication between them.

The lower portion of the partition wall may have, for each seat, a tray table that is mounted so as to be able to move between a stowed position in which the tray table is stowed vertically and a use position in which the tray table is arranged horizontally. In the use position, the upper face of each tray table may be flush with the upper edge of the lower portion.

The securing means may comprise:

(i) a first snug-fitting element that is joined to a sidewall of the cabin and extends along a vertical edge of the upper portion that is oriented towards said sidewall, (ii) a second snug-fitting element that is joined to said vertical edge engaging with the first snug-fitting element in the form of a snug fit between the first snug-fitting element and the second snug-fitting element, and (iii) a latch system comprising a latch mounted within the lower portion, a hole created in the upper portion and an actuator joined to the latch, wherein the actuator can be manipulated from outside the lower portion to cause the latch to pass from a securing position, in which the latch enters the hole, and a free position, in which the latch is outside the hole, and vice versa.

The latch system may be on the opposite side from the first snug-fitting element. The lower portion of the partition wall may have a slot, the actuator has a recess that is joined to the latch and is housed inside the lower portion behind said slot, and a card that is designed to be inserted into the recess, passing through the slot.

BRIEF DESCRIPTION OF THE DRAWINGS

The abovementioned features of the invention, as well as others, will become more clearly apparent upon reading the following description of an exemplary embodiment, said description being given with reference to the appended drawings, of which.

DETAILED DISCLOSURE OF EMBODIMENTS

Figure 1:
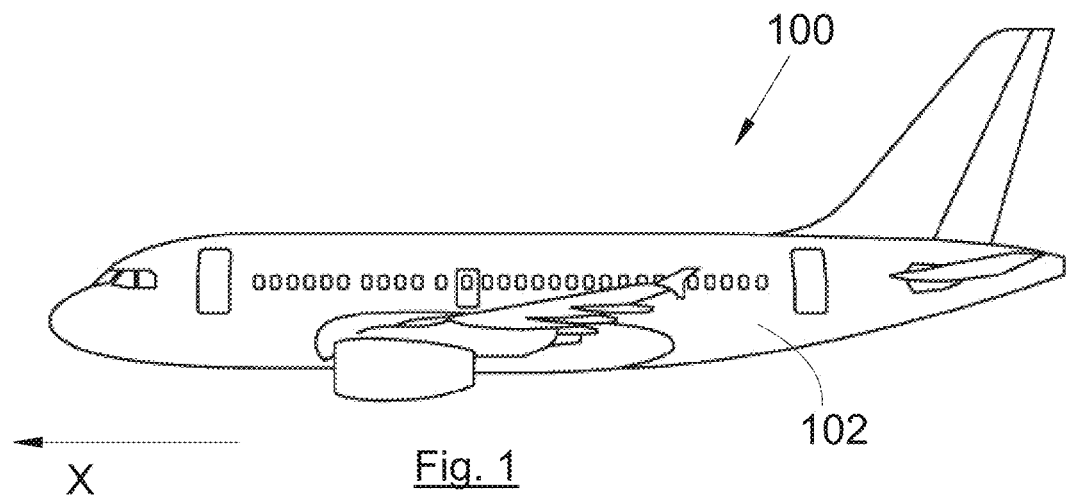
FIG. 1 shows a side view of an aircraft according to an embodiment of the invention.

In the following description, the position-related terms are considered with reference to an aircraft in the normal operating position, that is to say as shown in FIG. 1 with its normal direction of advance (X) oriented to the right.

FIG. 1 shows an aircraft 100 that comprises a cabin 102 within which is installed a floor 108 to which are attached seats 104a-b. The cabin 102 is behind a wall separating the cockpit which is for pilots from the cabin 102 which is for passengers.

Figure 2:
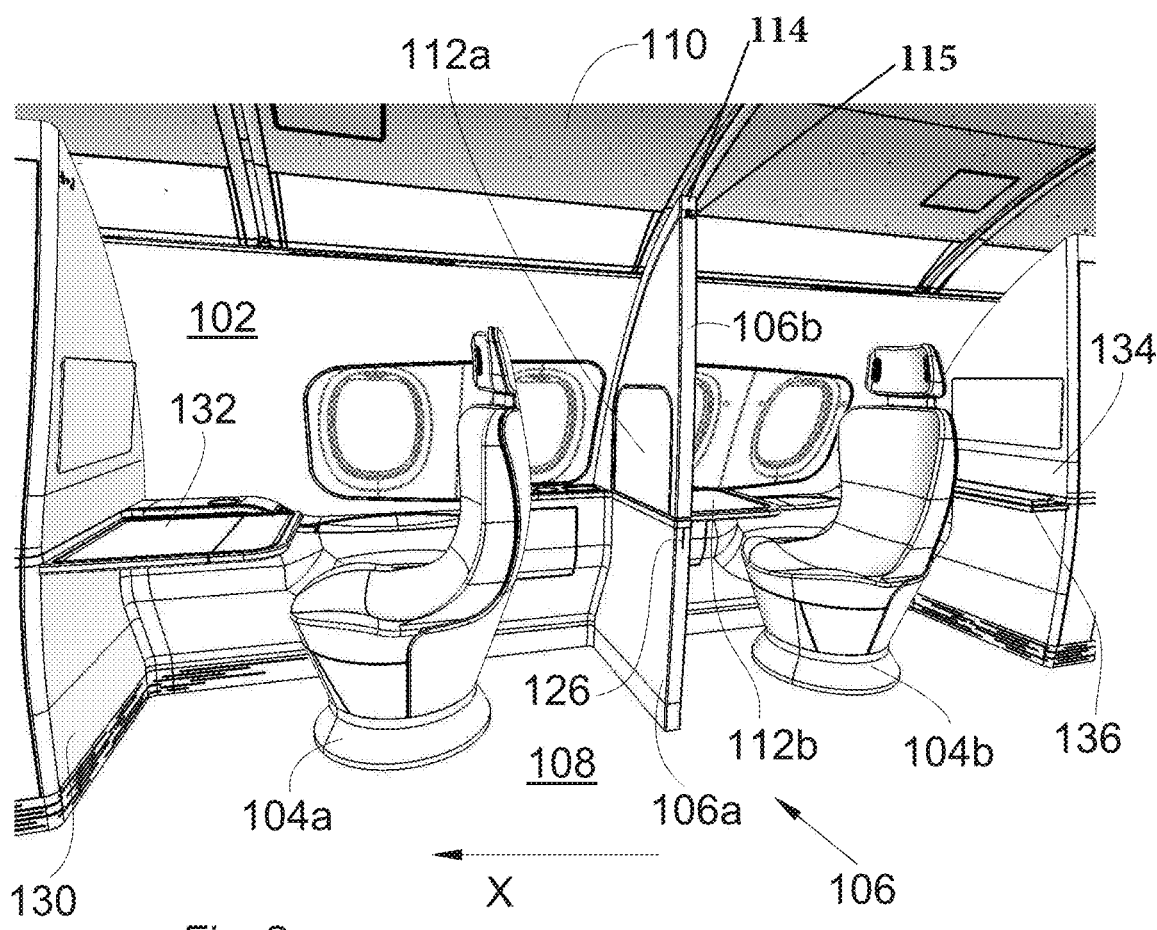
FIGS. 2 and 3 are perspective views of the configuration of the aircraft, in two different positions.
Figure 3:
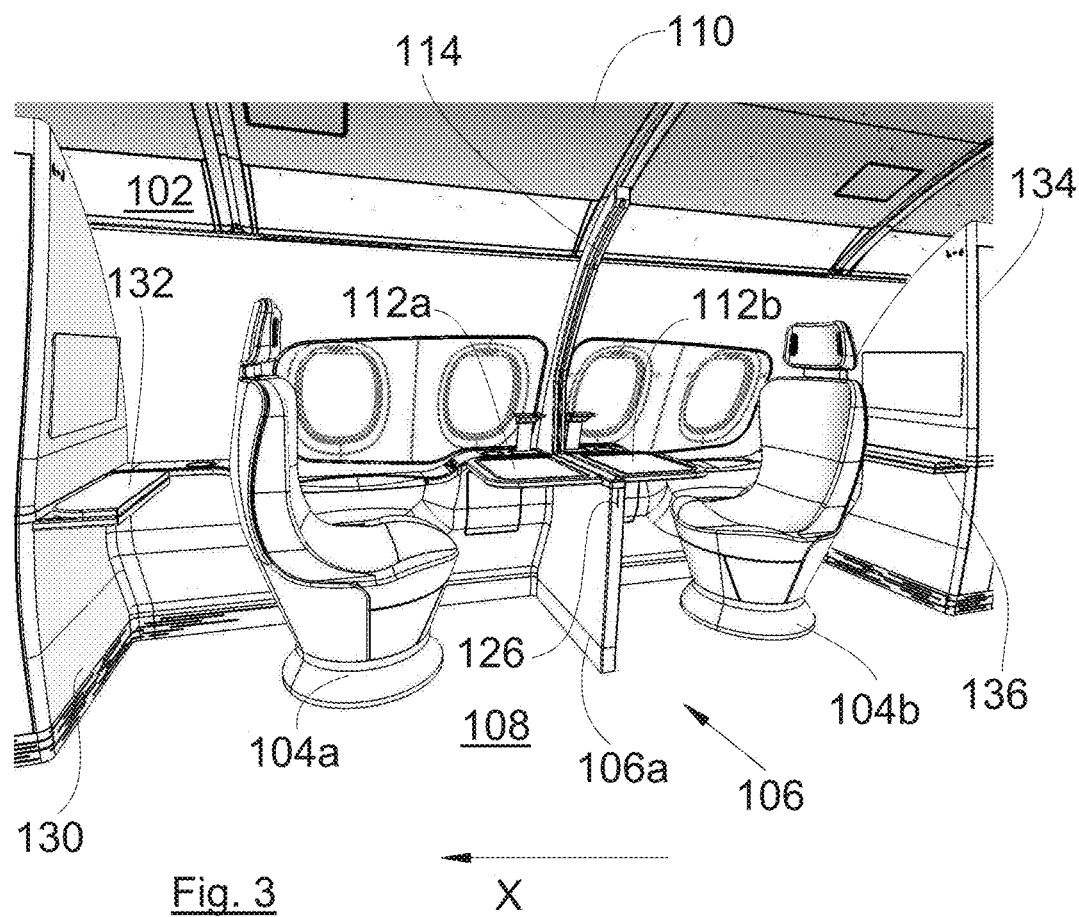

FIGS. 2 and 3 show the internal configuration of the aircraft 100. The aircraft 100 comprises at least two seats 104a-b which are installed one behind the other with respect to the direction of advance (X) of the aircraft 100. The seat having the reference 104b is the rear seat and it is positioned behind the front seat having the reference 104a.

The aircraft 100 has a partition wall 106 that is positioned between the front seat 104a and the rear seat 104b. The partition wall is perpendicular to the floor 108 and perpendicular to the direction of advance X. In this case, the partition wall 106 extends from the floor 108 to the ceiling 110, but other heights are possible. The width of the wall 106 is sufficient to prevent one seat 104a-b from being seen from the other seat 104b-a while leaving some of the floor 108 free such that people can move about the aircraft 100 and between at least the rear seat and the partition wall.

The partition wall 106 has a lower portion 106a and an upper portion 106b. The lower portion 106a is fixed while the upper portion 106b is removable. The lower portion 106a is secured, to the floor 108 and to the sidewall of the cabin 102.

To make it possible to remove the upper portion 106b, the partition wall 106 has securing means that are able to adopt a securing position, in which the upper portion 106b is secured to the lower portion 106a, and a release position, in which the upper portion 106b can be detached from the lower portion 106a, such that they can be separated.

FIG. 2 shows the internal configuration of the aircraft 100 in what is referred to as a confidentiality configuration, which corresponds to the securing position of the securing means and the partition wall 106.

FIG. 3 shows the internal configuration of the aircraft 100 in what is referred to as a communication configuration, which corresponds to the release position of the securing means and the partition wall 106.

To allow closer communication between the passenger of the front seat 104a and the passenger of the rear seat 104b, the front seat 104a is able to pivot about an axis perpendicular to the floor 108, through an angle of at least 180°. After pivoting the front seat 104a and removing the upper portion 106b, the passengers can communicate freely.

To be able to put down objects or meal trays, the lower portion 106a has, for each seat, a tray table 112a-b that is mounted so as to be able to move between a stowed position (FIG. 2 for the tray table 112a) and a use position (FIG. 3). In the stowed position, the tray table 112a-b is stored vertically, in this case against the upper portion 106b, and, in the use position, the tray table 112a-b is positioned horizontally in front of the corresponding seat 104a-b.

In this case, each tray table 112a-b is mounted to be able to rotate on the lower portion 106a about a horizontal axis of rotation.

To avoid having a step between the lower portion 106a and the tray tables 112a-b in the use position, the upper face of each tray table 112a-b is flush with the upper edge of the lower portion 106a, when said tray table 112a-b is in the use position.

To hold the upper portion 106b on the lower portion 106a, the wall 106 comprises a first snug-fitting element 114 that is joined to the lower portion 106a, is secured to the sidewall of the cabin 102 and extends along the vertical edge of the upper portion 106b which is oriented towards said sidewall of the cabin 102. The first snug fitting element 114 may be a channel beam configured to receive edges of the upper portion 106a and the lower portion 106b. The upper portion 106b has, along this vertical edge, a second snug-fitting element that is joined to said vertical edge and engages with the first snug-fitting element 114 in the form of a snug fit between the first snug-fitting element 114 and the second snug-fitting element.

In the embodiment of the invention shown here, the first snug-fitting element 114 is in the form of a groove of a channel and the second snug-fitting element is in the form of a tongue that fits into the groove. However, an inverted configuration is possible in which the first snug fitting element has a tongue and the second snug fitting element has a groove.

Figure 4:
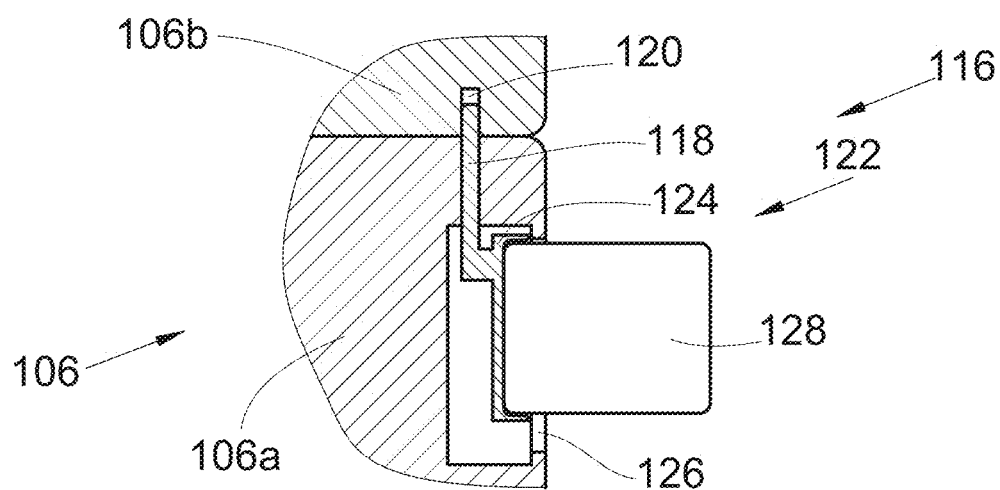
FIG. 4 is a section view of a partition wall.

FIG. 4 shows a section through a vertical plane of the wall 106, showing part of the securing means, such as a latch system 116.

To immobilize the upper portion 106b against the first snug-fitting element 114, the wall 106 comprises a latch system 116.

The latch system 116 comprises a latch 118 mounted within the lower portion 106a, a hole 120 created in the upper portion 106b and designed to receive the latch 118 and an actuator 122 joined to the latch 118.

The latch 118 is able to move in vertical translation between a securing position (FIG. 4), in which the latch 118 enters the hole 120, and a release position, in which the latch 118 is outside the hole 120. In the securing position, the latch 118 immobilizes the upper portion 106b, whereas in the release position the latch 118 does not immobilize the upper portion 106b, which can be detached from the lower portion 106a.

The actuator 122 can be manipulated by hand from outside the lower portion 106a and serves to actuate the latch 118 in order to switch it from the securing position to the release position, and vice versa.

The securing means may comprise the first snug-fitting element 114, the second snug-fitting element and the latch system 116.

To ensure a better hold and to facilitate manipulation of the latch 118, the latch system 116 is placed on the side opposite the sidewall of the cabin 102 that is to say on the opposite side from the first snug-fitting element 114.

In the embodiment of the invention shown here, the actuator 122 is in the form of a recess 124 that is joined to the latch 118 and is housed inside the lower portion 106a behind a slot 126 in the edge face of the lower portion 106a. The actuator 122 also has a card 128, preferably of the plastic card type, which is designed to be inserted into the recess 124, passing through the slot 126. After insertion of the card 128 into the recess 124, an upward or downward movement of the card 128 moves the recess 124 respectively up or down, thus switching the latch 118 respectively into the securing position or the release position.

It is also possible to make the rear seat 104b able to pivot about an axis perpendicular to the floor 108, through an angle of at least 180°, and it is possible to provide the aircraft 100 with a front wall 130 in front of the front seat 104a, which front wall has a stowable tray table 132, and with a rear wall 134 behind the rear seat 104b, which rear wall has a stowable tray table 136.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft having a direction of advance and including a cabin, wherein the cabin comprises:
   a floor,
   a front seat and a rear seat arranged behind the front seat with respect to the direction of advance, the front seat configured to pivot about an axis perpendicular to the floor and through an angle of at least 180 degrees, and
   a partition wall between the front seat and the rear seat, perpendicular to the floor and perpendicular to the direction of advance, wherein the partition wall includes a fixed lower portion and a removable upper portion, and a securing mechanism having a securing position configured to latch and secure the upper portion to the lower portion, and a release position in which the upper portion is detachable from the lower portion.

2. The aircraft according to claim 1, wherein the lower portion has, for each of the front and rear seats, a tray table moveable between a stowed position in which the tray table is stowed vertically and a use position in which the tray table is arranged horizontally.

3. The aircraft according to claim 2, wherein, while in the use position, an upper face of each of the tray tables is flush with the upper edge of the lower portion.

4. The aircraft according to claim 1, further comprising:
a first snug-fitting element joined to a sidewall of the cabin and which extends along a vertical edge of the upper portion that is oriented towards the sidewall.

5. The aircraft of claim 1 wherein the securing mechanism includes a latch system comprising:
a latch mounted within the lower portion,
a hole created in the upper portion, and
an actuator joined to the latch,
wherein the actuator is configured to be manipulated from outside the lower portion to cause the latch to move between a securing position, in which the latch enters the hole, and a free position, in which the latch is outside the hole.

6. The aircraft according to claim 5, wherein the latch system is on an opposite side of the upper portion of the partition wall from the first snug-fitting element.

7. The aircraft according to claim 5, wherein the lower portion of the partition wall has a slot and the actuator has a recess, and the slot is configured to receive a card to be inserted into the recess.

8. A passenger cabin in an aircraft comprising:
a floor,
a front seat mounted on a swivel mount attached to the floor, wherein the swivel mount is configured to rotate the seat through 180 degrees of rotation about an axis of the swivel mount which is perpendicular to the floor;
a rear seat behind the front seat and mounted to the floor, wherein the rear seat is immediately behind the front seat;
a partition wall between the front seat and the rear seat, wherein the partition wall includes a fixed lower portion and a removable upper portion, and
a latch system having a securing position in which the upper portion is secured to the lower portion and positioned between the front and rear seats, and a release position in which the upper portion is detachable from the lower portion.

9. The passenger cabin as in claim 8 wherein the front seat and rear seat are aft of a wall separating a cockpit from the passenger cabin.

10. The passenger cabin as in claim 8, further comprising a first tray table mounted to a forward side of the fixed lower portion and a second tray table mounted to a rearward side of the fixed lower portion.

11. The passenger cabin according to claim 10, wherein the first and second tray tables each are configured to move between a stowed position and a use position, wherein while in the use position the first and second tray tables are oriented horizontally and horizontally aligned with an upper edge of the fixed lower portion.

12. The passenger cabin as in claim 8, wherein the latch system includes:
a first snug-fitting element joined to a sidewall of the cabin, extending along a vertical edge of the upper portion and is oriented towards the sidewall, and
a latch mounted within the lower portion and configured to releasably latch the upper portion to the lower portion, wherein the latch is proximate an edge of the lower portion opposite to the sidewall of the cabin.

13. The passenger cabin of claim 12, wherein the latch includes a hole in the upper portion and an actuator configured to be manipulated from outside the lower portion to move the latch between a securing position, in which the latch enters the hole, and a free position, in which the latch is outside the hole.

14. The passenger cabin according to claim 13, wherein the lower portion includes a slot aligned with the hole such that a card may be inserted into the recess to manipulate the actuator.

* * * * *